(12) United States Patent
Harada (10) Patent No.: US 9,557,677 B2
(45) Date of Patent: Jan. 31, 2017

(54) IMAGE FORMING APPARATUS AND IMAGE FORMING METHOD THAT CORRECT VARIATION IN RESIDUAL QUANTITY OF PRINTING AGENT

(71) Applicant: KYOCERA Document Solutions Inc., Osaka (JP)

(72) Inventor: Takashi Harada, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/011,351

(22) Filed: Jan. 29, 2016

(65) Prior Publication Data

US 2016/0223930 A1 Aug. 4, 2016

(30) Foreign Application Priority Data

Jan. 29, 2015 (JP) .................. 2015-015159

(51) Int. Cl.
| | | |
|---|---|---|
| *G03G 15/01* | (2006.01) | |
| *G06F 3/12* | (2006.01) | |
| *G03G 15/00* | (2006.01) | |

(52) U.S. Cl.
CPC ............ *G03G 15/01* (2013.01); *G03G 15/556* (2013.01); *G06F 3/1219* (2013.01); *G06F 3/1235* (2013.01); *G03G 2215/0132* (2013.01)

(58) Field of Classification Search
CPC ....... G03G 15/01; G06F 3/1219; G06F 3/1235
USPC ....................................... 399/39, 41
See application file for complete search history.

(56) References Cited

FOREIGN PATENT DOCUMENTS

JP 2008-129086 A 6/2008

*Primary Examiner* — Hoang Ngo
(74) *Attorney, Agent, or Firm* — Hawaii Patent Services; Nathaniel K. Fedde; Kenton N. Fedde (57) ABSTRACT

Provided is an image forming apparatus that can correct variation in printing agent residual quantity and can extend the period being able to support full color printing based on original image data. A printing agent residual quantity detecting part detects printing agent residual quantity. A color scheme selection tendency management part manages an amount of the printing agent. A remaining number calculation part computes printable number of sheets for each color. Adjustment request screen generating part generates, when variation of the printable number of sheets for each color is greater than or equals to a fixed quantity, a printing agent using amount adjustment requesting screen for accepting the conversion condition to correct the variation. An image processing part performs color balance conversion of the image data. A printing part prints the image data performed the color balance conversion.

3 Claims, 7 Drawing Sheets

| | USING RATE | TONER USAGE / UNIT NUMBER OF SHEETS (ONE SHEET) 92 | | | |
|---|---|---|---|---|---|
| | | CYAN | MAGENTA | YELLOW | BLACK |
| USER A | Pa% | #Ca | #Ma | #Ya | #Ka |
| USER B | Pb% | #Cb | #Mb | #Yb | #Kb |
| USER C | Pc% | #Cc | #Mc | #Yc | #Kc |
| USER D | Pd% | #Cd | #Md | #Yd | #Kd |

FIG.6

| SIMILAR COLOR INFORMATION (USER a) 94 | | | | |
|---|---|---|---|---|
| CYAN | MAGENTA | YELLOW | BLACK |
| — | — | 0.9 | — |
| — | — | 0.95 | — |
| 0.93 | — | — | — |
| — | 0.9 | — | 0.95 |

IMAGE FORMING APPARATUS AND IMAGE FORMING METHOD THAT CORRECT VARIATION IN RESIDUAL QUANTITY OF PRINTING AGENT

INCORPORATION BY REFERENCE

This application is based on and claims the benefit of priority from Japanese Patent Application No. 2015-015159 filed on Jan. 29, 2015, the contents of which are hereby incorporated by reference.

BACKGROUND

The present disclosure is related with the image forming apparatus and image forming method that perform image formation by using printing agents for a plural color.

In recent years, an image forming apparatus that can prints with full color is popular by using toner (a kind of a printing agent) for a plural color. In such an image forming apparatus, it is common that remaining toner amount shows variation according to tendency of the color selection by a user. However, if toner of a specific color is run out, it becomes impossible to carry out the full color printing. Therefore, a typical apparatus is proposed. This apparatus compares the detected remaining toner amount and required toner amount for each color needed for printing the image data having instructed printing. When it is discriminated that printing is impossible, the image data having instructed printing is converted to a substitutive data that uses only an extant toner and is printed.

SUMMARY

An image forming apparatus in the present disclosure prints image data by using the printing agent for a plural color. The image forming apparatus has a printing agent residual quantity detecting part, a color scheme selection tendency management part, a remaining number calculation part, an adjustment request screen generating part, an image processing part, and a printing part. The printing agent residual quantity detecting part detects printing agent residual quantities for the plural color, respectively. The color scheme selection tendency management part manages an amount of the printing agent used per unit number of sheets for each color as color scheme selection tendency information. The remaining number calculation part computes printable number of sheets, which shows a number being able to be printed with the printing agent residual quantity, for each color, respectively, based on the printing agent residual quantity and the color scheme selection tendency information. The adjustment request screen generating part generates, when variation in the printable number of sheets for each color is greater than or equals to a fixed quantity, a printing agent using amount adjustment requesting screen that accepts a conversion condition to correct the variation. The image processing part performs color balance conversion of the image data in the conversion condition, which is selected and accepted in the printing agent using amount adjustment requesting screen. The printing part prints the image data, which is performed color balance conversion.

An image forming method in the present disclosure prints image data by using the printing agent for a plural color. At first, printing agent residual quantities for a plural color is detected, respectively. Then, an amount of the printing agent used per unit number of sheets for each color is managed as color scheme selection tendency information. Then, based on the printing agent residual quantity and the color scheme selection tendency information, printable number of sheets that can be printed with the printing agent residual quantity is computed for each color, respectively. Then, when variation of the printable number of sheets for each color is greater than or equals to a fixed quantity, a printing agent using amount adjustment requesting screen that accepts a conversion condition to correct the variation is generated. Then, color balance conversion of the image data is performed in the conversion condition, which is accepted in the printing agent using amount adjustment requesting screen. Then, the image data, which is performed the color balance conversion, is printed.

DETAILED DESCRIPTION

Then, the embodiment of the present disclosure is explained in detail with reference to drawings. In following embodiments, an example that uses a toner as a printing agent and four colors as a plural colors is explained. As refer to FIG. 1, image forming apparatus 1 of the present embodiment is a color copying machine in which four image formation parts 10a, 10b, 10c, and 10d are allocated in printing part 2. Image forming apparatus 1 is provided with manuscript reading part 5, manuscript feeding part 6, and operation part 7. Manuscript reading part 5 is allocated in the upper part of printing part 2, and manuscript feeding part 6 is allocated in the upper part of manuscript reading part 5. Operation part 7 is allocated in front of a side of image forming apparatus 1.

Figure 1:
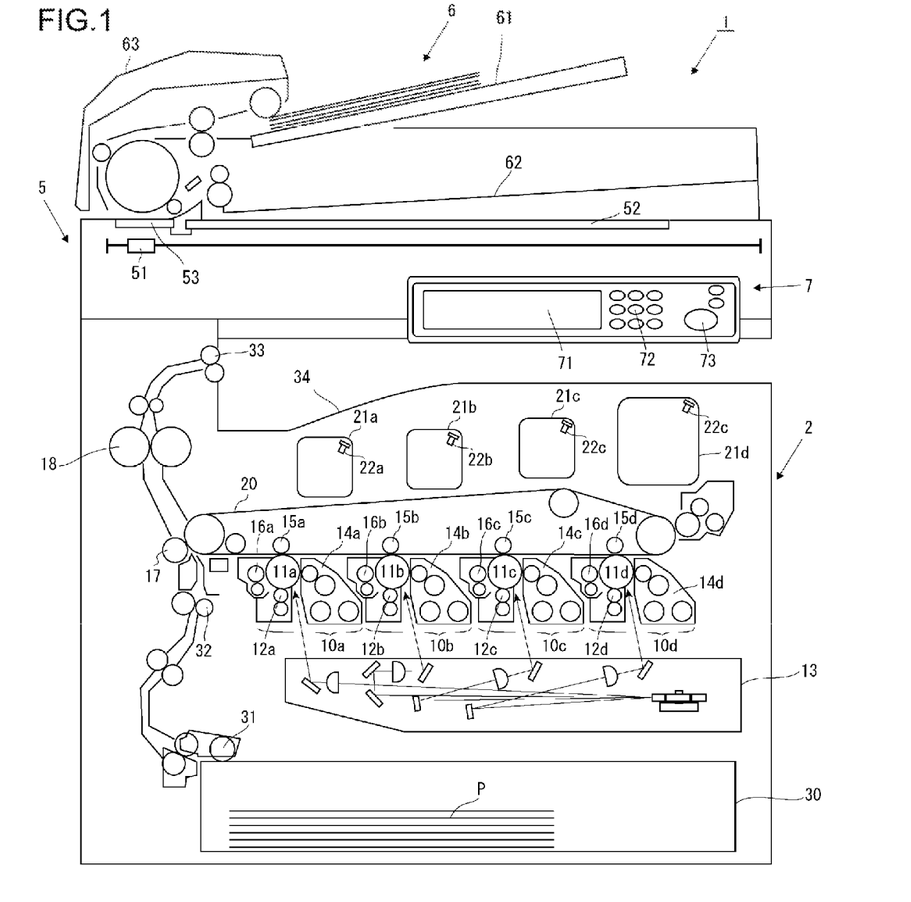
FIG. 1 is an outline schematic cross section showing an internal configuration of the embodiment of the image forming apparatus according to the present disclosure.

Display part 71 and numeric keypad 72 are included in operation part 7. By operating operation part 7 and inputting instructions, a user sets various kinds of setup of image forming apparatus 1, and various functions, such as image formation, is performed. Display part 71 is a display part, such as a liquid crystal display panel that displays a state, an image formation situation, and number of prints for image forming apparatus 1. Display part 71 can be used for various instructions and various setup as a touch panel, which a transparent pressure-sensitive sensor is provided on the surface of the liquid crystal display panel. The various instructions are color printing, monochrome printing, double-side printing, or the like. The various setup are a magnification setup, a density setup, or the like. Also, display part 71 can display colors. The image data with color-display is shown on display part 71 as a preview image.

Manuscript reading part 5 includes scanner 51, platen glass 52, and manuscript reading slit 53. Scanner 51 includes LED (Light Emitting Diode), a CCD (Charge Coupled Device) sensor, or the like. Scanner 51 is configured movable to the transportation direction of the manuscript by manuscript feeding part 6. Also, scanner 51 reads a manuscript as an image data that each pixel has color components of R (red), G (green), and B (blue). Platen glass 52 is a manuscript stand having a transparent member, such as glass. Manuscript reading slit 53 has a slit formed in the direction that intersects perpendicularly with the transportation direction of the manuscript by manuscript feeding part 6.

When reading the manuscript placed on platen glass 52, scanner 51 is moved to the position that faces platen glass 52. Scanner 51 reads a manuscript, scanning the manuscript placed in platen glass 52, and obtains image data. Scanner 51 outputs the obtained image data to printing part 2. Also, when reading the manuscript conveyed by manuscript feeding part 6, scanner 51 is moved to the position that faces manuscript reading slit 53. Scanner 51 synchronizes with the conveying action of the manuscript by manuscript feeding part 6 via manuscript reading slit 53, reads the manuscript, and obtains an image data. Scanner 51 outputs the obtained image data to printing part 2.

Manuscript feeding part 6 includes manuscript mounting part 61, manuscript discharging part 62, and manuscript transport mechanism 63. The manuscript placed on manuscript mounting part 61 is fed out one sheet at a time in order by manuscript transport mechanism 63, and it is conveyed in the position that faces manuscript reading slit 53. After that, the manuscript is discharged by manuscript discharging part 62. Manuscript feeding part 6 is configured as retractable. The upper surface of platen glass 52 can be opened widely by lifting manuscript feeding part 6 upward.

Four image formation parts 10a, 10b, 10c, and 10d, respectively, corresponding to the image data of different four colors, which are C (cyan), M (magenta), Y (yellow), and K (black), are allocated in printing part 2. Also, intermediate transfer belt 20 is adjoined and provided in four image formation parts 10a, 10b, 10c, and 10d. Photo conductor drums 11a, 11b, 11c, and 11d, which support the visible image (toner image) for each color, are allocated in four image formation parts 10a, 10b, 10c, and 10d, respectively. The toner image formed on photo conductor drums 11a, 11b, and 11c and 11d is sequentially-transferred on intermediate transfer belt 20 that moves with contacting photo conductor drums 11a, 11b, 11c, and 11d. The toner image sequentially-transferred on intermediate transfer belt 20 is transferred on recording paper P at once by secondary transfer roller 17. Recording paper P is stored in paper cassette 30, which is under printing part 2. Recording paper P is conveyed via feed roller 31 and registration roller 32 to secondary transfer roller 17. The toner image transferred on recording paper P is fixed on recording paper P by fixing device 18. Recording paper P, which printing has been performed, is discharged from the apparatus main body to discharging tray 34 by ejection roller 33.

Photo conductor drums 11a, 11b, 11c, and 11d are allocated in four image formation parts 10a, 10b, 10c, and 10d, respectively, with allowing free rotation. In circumference to the photo conductor drums 11a, 11b, 11c, and 11d, electrification units 12a, 12b, 12c, and 12d that electrify photo conductor drums 11a, 11b, 11c, and 11d, respectively, are provided. Also, exposure unit 13 that exposes image information to photo conductor drums 11a, 11b, 11c, and 11d, respectively, are provided. Also, developing units 14a, 14b, 14c, and 14d that form a toner image on photo conductor drums 11a, 11b, and 11c and 11d, respectively, are provided. Also, primary transfer rollers 15a, 15b, 15c, and 15d that transfer the toner image on photo conductor drums 11a, 11b, and 11c and 11d, respectively, to intermediate transfer belt 20 are provided. Also, cleaning devices 16a, 16b, 16c, and 16d that remove the developing powder (toner) remained on photo conductor drums 11a, 11b, 11c, and 11d are provided.

Also, in printing part 2, toner containers 21a, 21b, 21c, and 21d that supply toner to four image formation parts 10a, 10b, 10c, and 10d, respectively, are provided. In toner containers 21a, 21b, 21c, and 21d, toner (a printing agent) for four colors, C (cyan), M (magenta), Y (yellow), and K (black), supplied to four developing units 14a, 14b, 14c, and 14d are stored, respectively. Then, in toner containers 21a, 21b, 21c, and 21d, remaining toner amount detecting parts 22a, 22b, 22c, and 22d (printing agent residual quantity detecting part) that detect remaining toner amount (printing agent residual quantity) are provided. As remaining toner amount detecting parts 22a, 22b, 22c, and 22d, an optical sensor, a piezoelectric element, or the like, can be used. In case by using the optical sensor, remaining toner amount is detected by directing light to toner, irradiating with light, and detecting the quantity of reflected light. In case of using the piezoelectric element, remaining toner amount is detected by measuring weight of toner.

Figure 2:
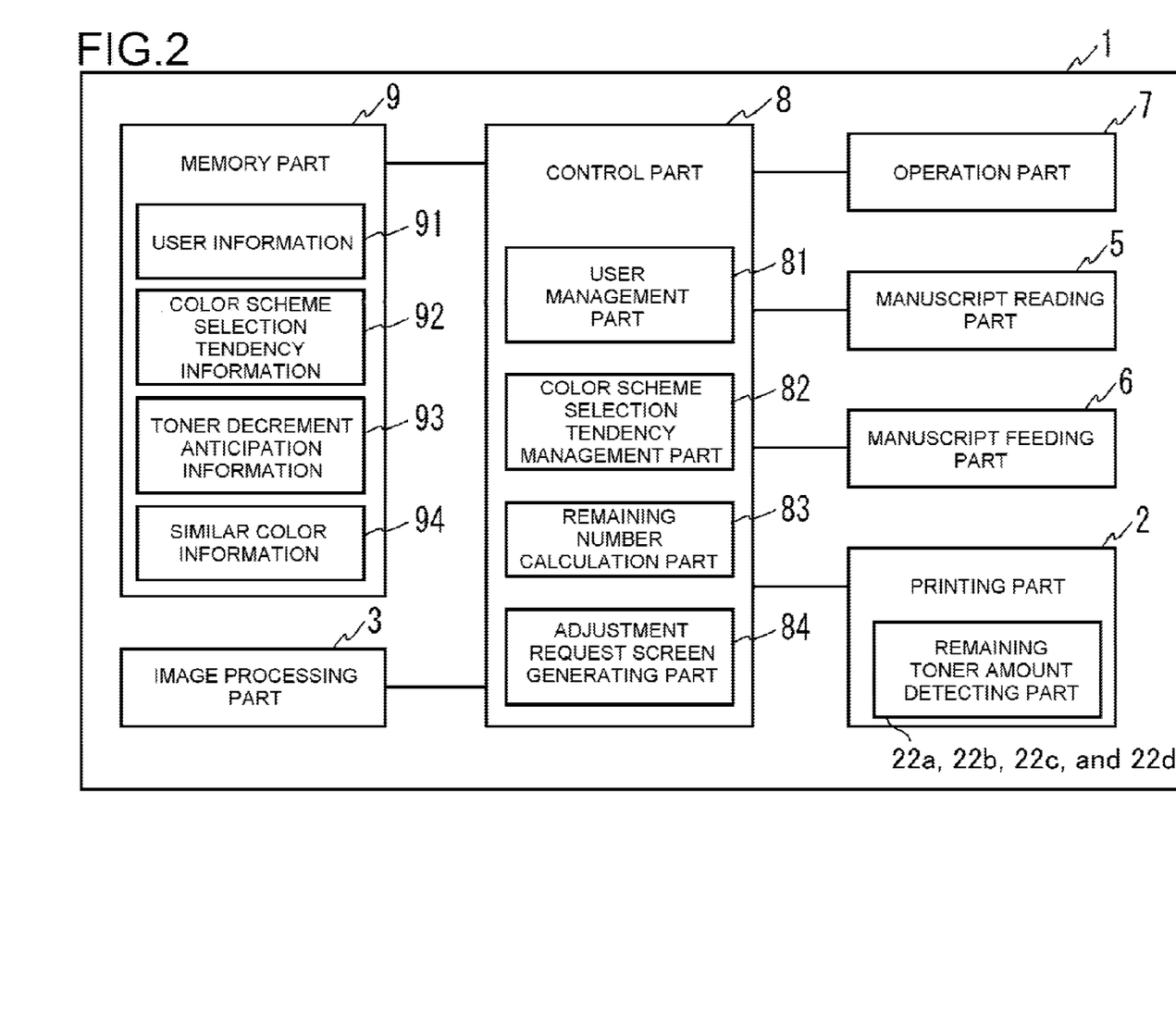
FIG. 2 is a block diagram showing a schematic structure of the image forming apparatus as shown in FIG. 1.

In FIG. 2, a block diagram illustrating a schematic structure of image forming apparatus 1 in the present embodiment is shown. Image forming apparatus 1 includes control part 8 connected to memory part 9 and image processing part 3. Control part 8 is an information processing part, such as a microcomputer: for example, CPU (Central Processing Unit) provided with non-transitory recording medium, such as ROM (Read Only Memory) and RAM (Random Access Memory). A control program for operation-controlling image forming apparatus 1 is stored in ROM. Control part 8 reads the control program stored in ROM and expands the control program to RAM. Thereby, each component is controlled as corresponded to specified instructions information inputted from operation part 7, and a sequence of image formation operation is realized. Each component is manuscript reading part 5, manuscript feeding part 6, image formation parts 10a, 10b, 10c, and 10d in printing part 2, intermediate transfer belt 20, fixing device 18, or the like. Also, control part 8 functions as user management part 81, color scheme selection tendency management part 82, remaining number calculation part 83, and adjustment request screen generating part 84.

Image processing part 3 is configured with an image processor that perform digital image processing at high speed, or the like. Image processing part 3 performs specified image processing for image data. Image processing part 3 performs a scaling process, adjust-image-quality process, such as density control and gradation adjustment, or the like. Also, image processing part 3 has a function that performs color space conversion for the image data. In the color space conversion, it converts from an RGB color system to a CMYK color system, and also it converts from the CMYK color system to the RGB color system. In performing full color printing, image processing part 3 performs the color space conversion of the image data having the RGB color system that consists of color components of R (red), G (green), and B (blue) to the CMYK color system that consists of color components of C (cyan), M (magenta), Y (yellow), and K (black). Image formation of the image data converted into the CMYK color system is performed by corresponding four image formation parts 10a, 10b, 10c, and 10d, respectively.

User management part 81 compares the user ID inputted from the operation part 7, or the like, as identification information to identify a user with user information 91 stored in memory part 9 as authentication conditions to authenticate the user. When this collation matches, that is, in case that the inputted user ID is recorded on user information 91, user management part 81 carries out a login process and permits use of image forming apparatus 1 for the authenticated user.

Figure 3:
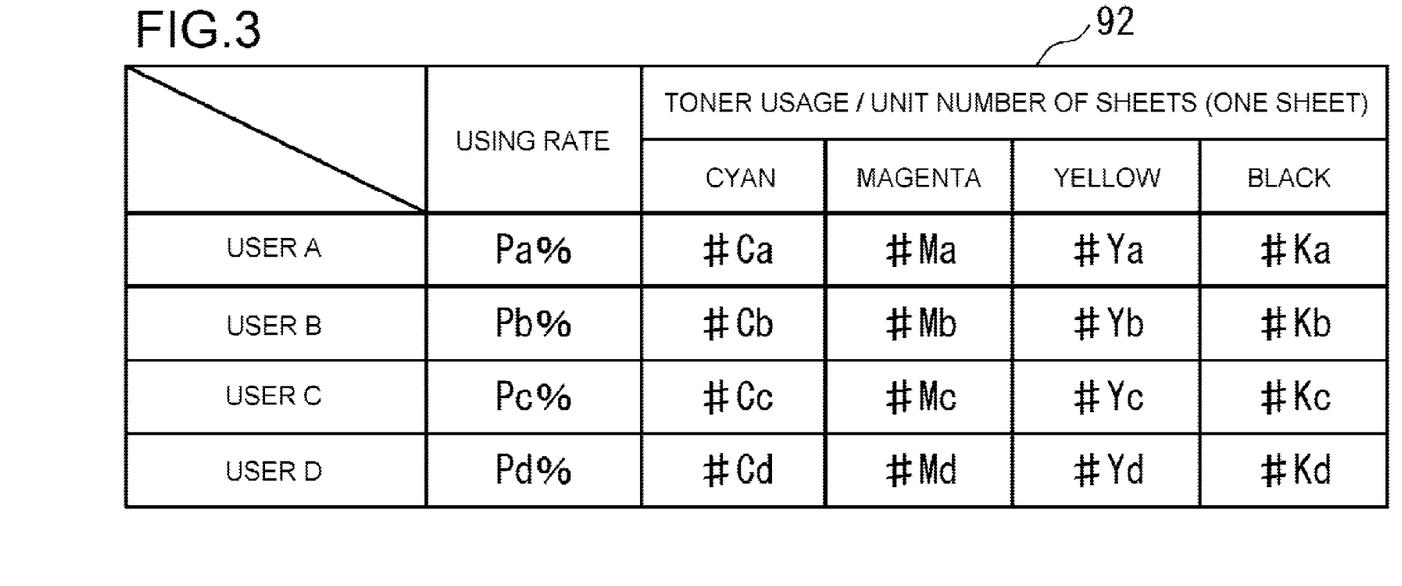
FIG. 3 is a tabular figure showing an example of color scheme selection tendency information stored in memory part as shown in FIG. 3.

Color scheme selection tendency management part 82 measures number of printings for each user. Thereby, color scheme selection tendency management part 82 computes using rate P % that accounts for all the numbers of printings for each user, respectively. Also, color scheme selection tendency management part 82, based on the image data of the CMYK color system in which the user printed, computes for each user about toner usage per unit number of sheets for each color #C, #M, #Y, and #K. The toner usage is an example of the amount of the printing agent used in the present embodiment. Then, color scheme selection tendency management part 82 stores computed using rate P % and toner usage #C, #M, #Y, and #K in memory part 9 as color scheme selection tendency information 92 as shown in FIG. 3. In the example of color scheme selection tendency information 92 as shown in FIG. 3, four people, user A-D, uses image forming apparatus 1. In color scheme selection tendency information 92 in this example, for each user, using rate Pa-d % A-D and toner usage #Ca-d, #Ma-d, #Ya-d and #Ka-d are stored, respectively.

Figure 4:
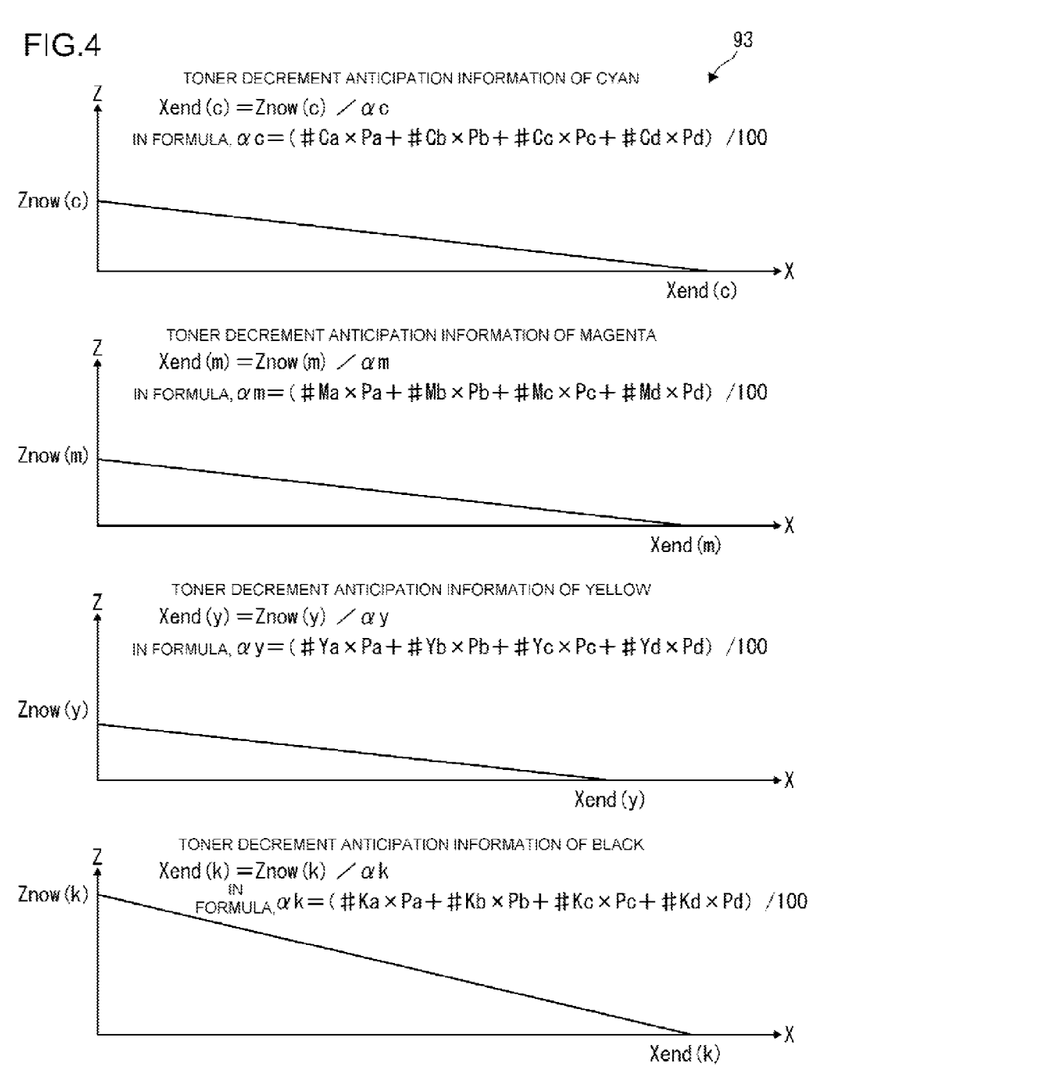
FIG. 4 is graphic charts showing an example of toner decrement anticipation information stored in memory part as shown in FIG. 3.

Remaining number calculation part 83 computes printable number of sheets for each color Xend (c), Xend (m), Xend (y), and Xend (k), respectively, based on color scheme selection tendency information 92 and remaining toner amount Znow (c), Znow (m), Znow (y), and Znow (k), which are detected by remaining toner amount detecting parts 22a, 22b, 22c, and 22d, respectively. Then, remaining number calculation part 83 stores remaining toner amount for each color Znow (c), Znow (m), Znow (y), and Znow (k), and computed printable number of sheets for each color Xend (c), Xend (m), and Xend (y) and Xend (k) in memory part 9 as toner decrement anticipation information 93 as shown in FIG. 4. As for computing the printable number of sheets Xend (c), Xend (m), Xend (y), and Xend (k) by remaining number calculation part 83, firstly, expected values, which is weighted toner usage #C, #M, #Y, and #K for each user with the using rate P % for each user, are computed as prediction toner usage alpha-c, alpha-m, alpha-y, and alpha-d, respectively. Then, it is performed that the remaining toner amount Znow (c), Znow (m), Znow (y), and the Znow (k), for each color is divided by the prediction toner usage alpha-c, alpha-m, alpha-y, and alpha-d, respectively.

Figure 5:
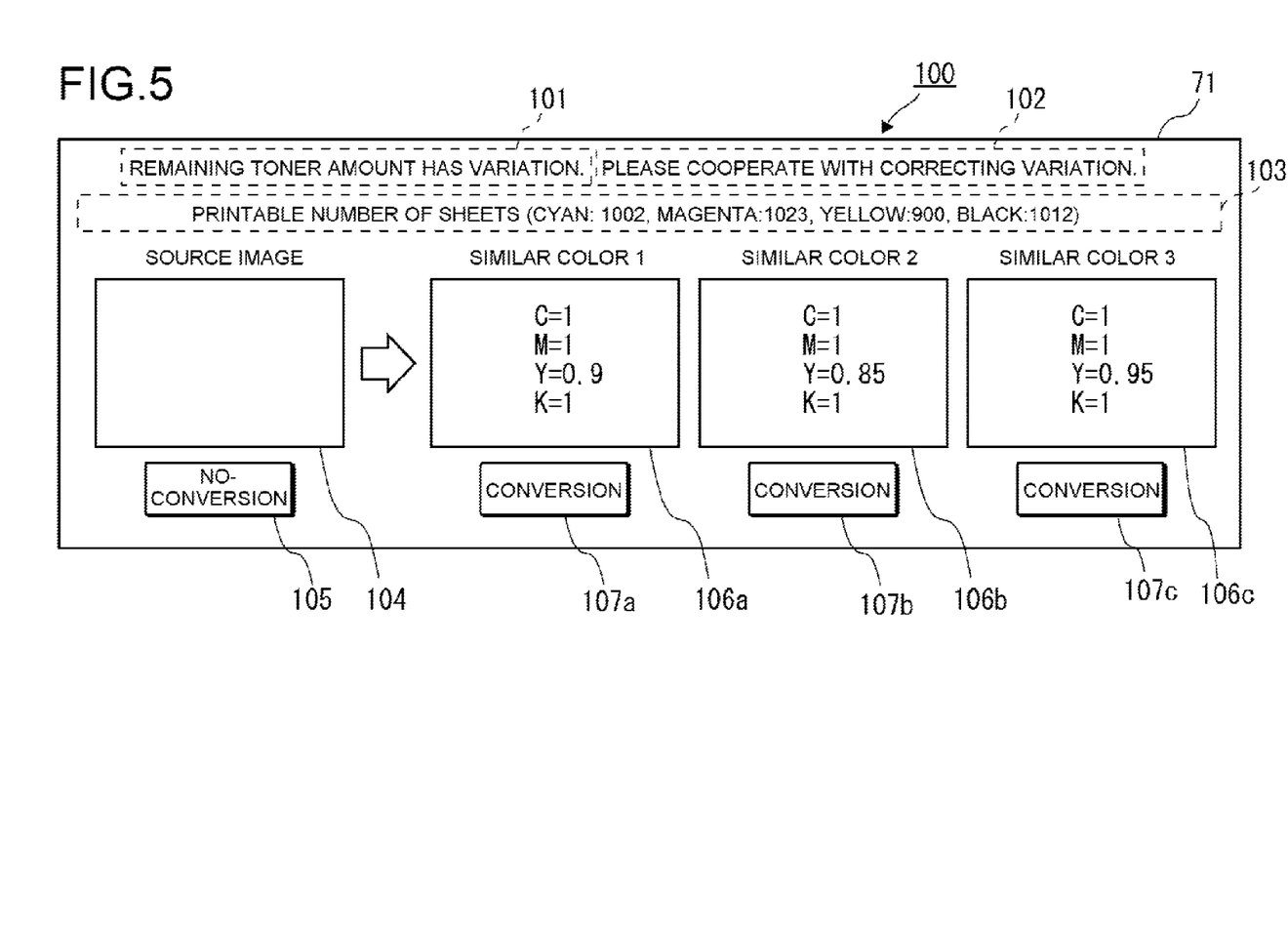
FIG. 5 is a screen example figure showing an example of a toner usage adjustment request screen displayed on display part 71 as shown in FIG. 3.

When there is variation that is greater than or equal to a set-up fixed quantity in the printable number of sheets Xend (c), Xend (m), Xend (y), and Xend (k) in toner decrement anticipation information 93, which is stored in memory part 9, adjustment request screen generating part 84 generates toner usage adjustment request screen 100 (printing agent using amount adjustment requesting screen) as shown in FIG. 5 and displays it on display part 71. For example, control part 8 determines that there is the variation that is greater than or equals to the fixed quantity if the difference between maximum value and minimum value in the printable number of sheets Xend (c), Xend (m), Xend (y), and Xend (k) exceeds a set-up threshold. In this case, control part 8 functions as adjustment request screen generating part 84. On toner usage adjustment request screen 100, variation informative message 101, request message 102, variation display column 103, source image display column 104, no-conversion key 105, similar color image display columns 106a, 106b, and 106c, and conversion keys 107a, 107b, and 107c are arranged. Variation informative message 101 notifies the variation in the remaining toner amount. Request message 102 requests correction of the variation. Variation display column 103 displays the printable number of sheets Xend (c), Xend (m), Xend (y), and Xend (k). Conversion keys 107a, 107b, and 107c instruct printing based on after-conversion image data.

Adjustment request screen generating part 84 generates a preview image based on the image data of the CMYK color system to print (hereinafter, it is called source image data.) Adjustment request screen generating part 84 displays the generated preview image on source image display column 104 in toner usage adjustment request screen 100. Then, if no-conversion key 105 in toner usage adjustment request screen 100 is operated, control part 8 performs a printing process based on the source image data.

Adjustment request screen generating part 84 generates a preview image based on an image data that the source image data is converted into a similar color (hereinafter, it is called after-conversion image data.) Adjustment request screen generating part 84 displays the generated preview image on similar color image display columns 106a, 106b, and 106c in toner usage adjustment request screen 100. Then, the user checks similar color image display columns 106a, 106b, and 106c. If there is an after-conversion image data that can permit printing, the user selects it and operates any one of corresponding conversion keys 107a, 107b, and 107c. When conversion keys 107a, 107b, and 107c are operated, control part 8 perform the color balance conversion process that converts the color balance of source image data in the selected conversion condition by image processing part 3. Control part 8 performs the printing process based on the after-conversion image data that the color balance is converted. Then, adjustment request screen generating part 84 stores the conversion condition of the selected after-conversion image data in memory part 9 as similar color information 94 for each user.

Figure 6:
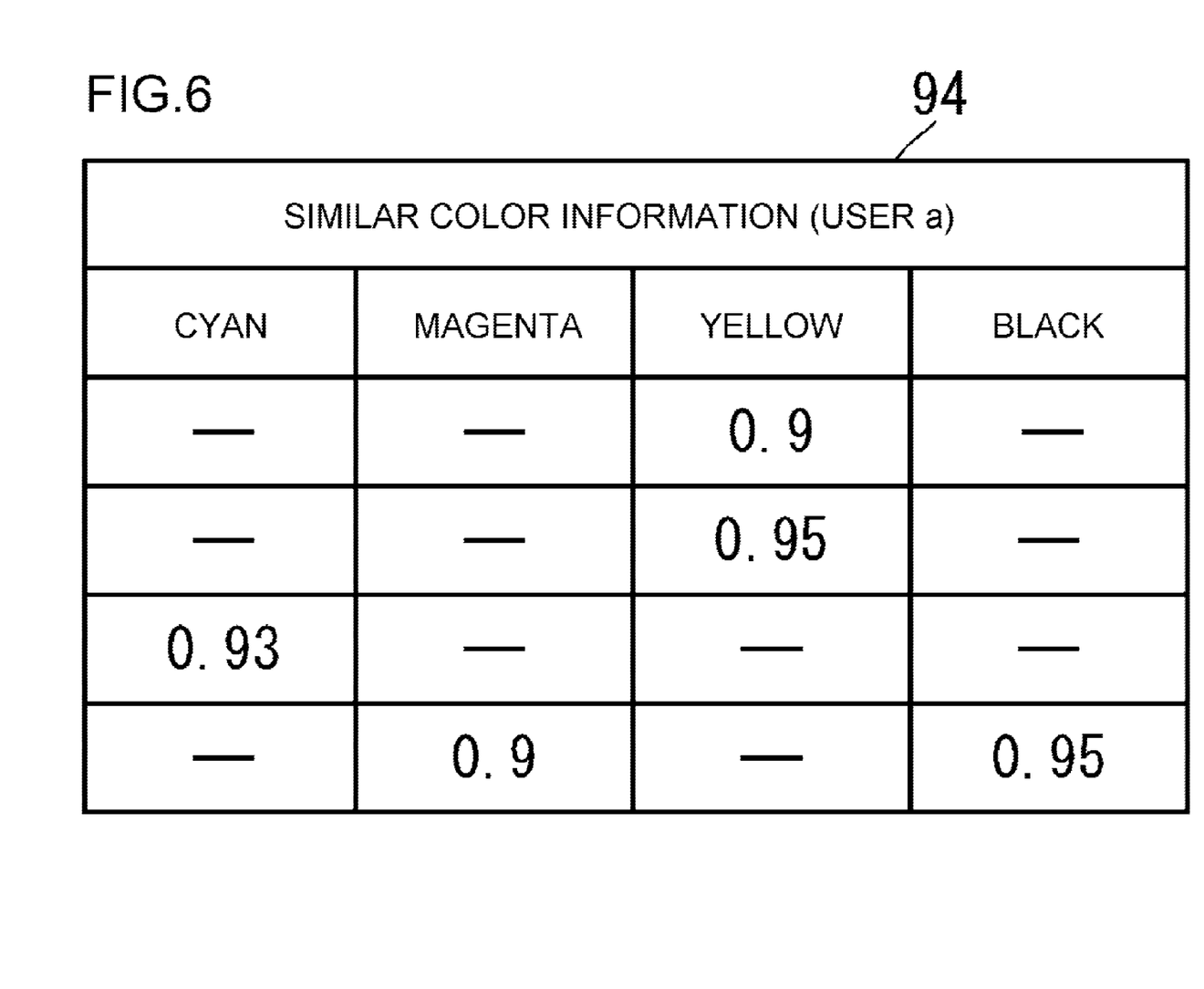
FIG. 6 is a tabular figure showing an example of similar color information stored in memory part as shown in FIG. 3.

Conversion of the source image data to the similar color by adjustment request screen generating part 84 is carried out, based on toner decrement anticipation information 93, in order that the variation of the printable number of sheets Xend (c), Xend (m), Xend (y), Xend (k) is to be corrected. That is, the color balance in the source image data is converted as reducing toner usage for a color where a printable number of sheets Xend for the color is less than the average of the printable number of sheets Xend (c), Xend (m), Xend (y), and Xend (k). In this case, the rate that converts color balance is the conversion condition. Adjustment request screen generating part 84 displays the preview images, which the conversion conditions are different, in the plurality of similar color image display columns 106a, 106b, and 106c, respectively. In FIG. 6, similar color information 94 for user a is shown. In this example, the conversion condition that reduces the toner usage for yellow to 90%, the conversion condition that reduces the toner usage for cyan to 93%, and the conversion condition that reduces the toner usage for magenta and black to 90% and 95%, respectively, are stored.

In addition, adjustment request screen generating part determines, based on toner decrement anticipation information 93, whether or not the matching conversion condition is stored in memory part 9 as similar color information 94. If the matching conversion condition is stored in memory part 9 as similar color information 94, adjustment request screen generating part 84 generates a preview image based on the after-conversion image data. The after-conversion image data is converted from the source image data in the conversion condition stored as similar color information 94.

Memory part 9 is a non-transitory recording medium, such as semiconductor memory and HDD (Hard Disk Drive). In memory part 9, a print data, such as a color image data, and various management information are stored. Also, in memory part 9, user information 91, color scheme selection tendency information 92, toner decrement anticipation information 93, and similar color information 94 are stored.

Figure 7:
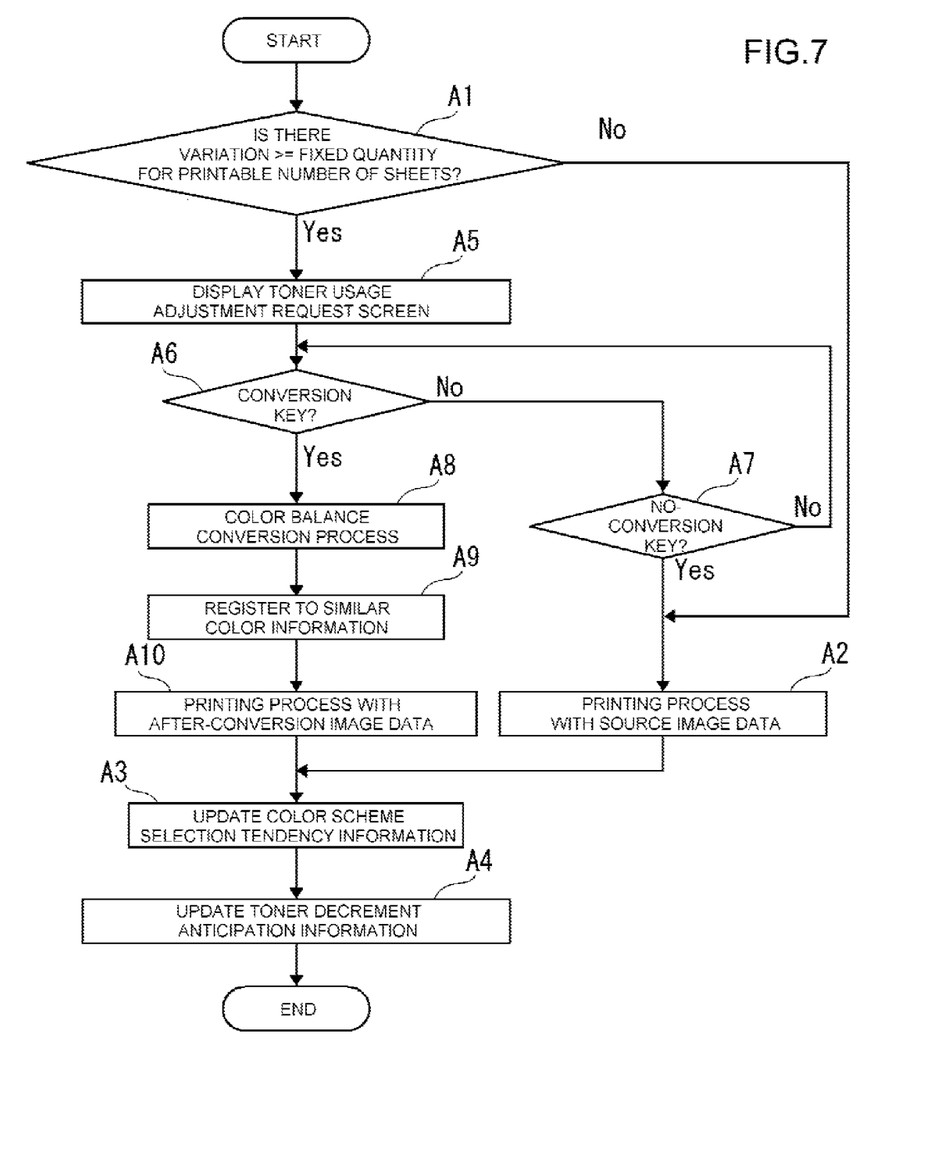
FIG. 7 is a flow chart for explaining remaining toner amount correction operation of the embodiment in the image forming apparatus according to the present disclosure.

Next, operation of control part 8 in the present embodiment is explained in detail with reference to FIG. 7. As refer to FIG. 3 here, when accepting printing instructions, control part 8 determines whether or not there is any variation greater than or equal to the set-up fixed quantity in printable number of sheets for each color Xend (c), Xend (m), Xend (y), and Xend (k) (Step A1). In this case, control part 8 determines based on toner decrement anticipation information 93 stored in memory part 9. If a difference between the maximum value and the minimum value in the printable number of sheets Xend (c), Xend (m), Xend (y), and Xend (k) exceeds the set-up threshold, control part 8 determines that the variation is greater than or equals to the fixed quantity.

In Step A1, if there is no variation greater than or equals to the set-up fixed quantity in the printable number of sheets Xend (c), Xend (m), Xend (y), and Xend (k), control part 8 performs the printing process based on the source image data (Step A2). Then, control part 8 functions as color scheme selection tendency management part 82. Color scheme selection tendency management part 82 updates color scheme selection tendency information 92 (step A3). Also, control part 8 functions as remaining number calculation part 83. Remaining number calculation part 83 computes the printable number of sheets for each color Xend (c), Xend (m), Xend (y), and Xend (k), respectively. Then, remaining number calculation part 83 updates toner decrement anticipation information 93 (step A4) and completes operation.

If there is the variation greater than or equals to the set-up fixed quantity in the printable number of sheets Xend (c), Xend (m), Xend (y), and Xend (k) in Step A1, control part 8 functions as adjustment request screen generating part 84. Adjustment request screen generating part 84 generates toner usage adjustment request screen 100 and displays it on display part 71 (step A5).

Next, control part 8 waits for the operation of conversion keys 107a, 107b, and 107c (Step A6) and the operation of no-conversion key 105 in toner usage adjustment request screen 100 (Step A7). In Step A7, if no-conversion key 105 is operated, it proceeds to Step A2, and control part 8 performs the printing process based on the source image data.

If conversion keys 107a, 107b, and 107c are operated in Step A6, control part 8 performs the color balance conversion process that converts the color balance of all the source image data by image processing part 3 in the conversion condition selected by operation of conversion keys 107a, 107b, and 107c (Step A8). Adjustment request screen generating part 84 stores the conversion condition for the selected after-conversion image data in memory part 9 as similar color information 94 for each user (Step A9). Then, control part 8 performs the printing process based on the after-conversion image data performed the color balance conversion process in Step A8 (Step A10) and proceeds to Step A3.

In addition, according to the present embodiment, it is configured to display a preview image on similar color image display columns 106a, 106b, and 106c in toner usage adjustment request screen 100 and to accept selection of the conversion condition by using the preview image. However, it may be displayed sample pictures, such as prepared textile patterns, in similar color image display columns 106a, 106b, and 106c, and it may accept the selection of the conversion condition by using the sample picture. Also, in toner usage adjustment request screen 100, it is preferred to notify the user by color classification, a symbol, a message, or the like. In this case, in similar color image display columns 106a, 106b, and 106c, it notifies the columns that most-effectively corrects the balance of printable number of sheets Xend (c), Xend (m), Xend (y), and Xend (k). Further, for example, the column that can mostly reduce the amount of the used toner for a color, which the least printable number of sheets Xend (c), Xend (m), Xend (y), and Xend (k) is available, is notified to the user as it can most-effectively correct the balance. Furthermore, if it applies for an integral-type toner in the present embodiment, it is especially effective to prevent the surplus toner being useless. The integral-type toner is that four types of toner for four colors, C (cyan),M (magenta), Y (yellow), and K (black), are integrated and sold.

As explained above, according to the present embodiment, it is image forming apparatus 1 that prints image data by using a toner of a plural color {4 colors, which are C (cyan), M (magenta), Y (yellow), and K (black)}. Remaining toner amount detecting parts 22a, 22b, 22c, and 22d detect remaining toner amount for the plural color Znow (c), Znow (m), Znow (y), and Znow (k), respectively. Color scheme selection tendency management part 82 manages the toner usage per unit number of sheets for each color #C, #M, #Y, and #K as color scheme selection tendency information 92. Remaining number calculation part 83 computes, based on remaining toner amount Znow (c), Znow (m), Znow (y), and Znow (k) and color scheme selection tendency information, printable number of sheets Xend (c), Xend (m), Xend (y), and Xend (k), which can be printed by remaining toner amount for each color Znow (c), Znow (m), Znow (y), and Znow (k), respectively. Adjustment request screen generating part 84 generates, when the variations of the printable number of sheets for each color Xend (c), Xend (m), Xend (y), and Xend (k) is greater than or equals to a fixed quantity, toner usage adjustment request screen 100 that accepts the conversion condition to correct the variation. Image processing part 3 performs color balance conversion of the image data in the conversion condition accepted with toner usage adjustment request screen 100. Printing part 2 prints the image data performed the color balance conversion. By this configuration, the variation in remaining toner amount Znow (c), Znow (m), Znow (y), and Znow (k) is accurately determined based on color scheme selection tendency information 92. Then, correction of the variation can be requested to the user. Thereby, before the toner of a specific color is exhausted and printing becomes impossible, the variation in remaining toner amount Znow (c), Znow (m), Znow (y), and Znow (k) can be corrected. As a result, the period that allows to support the full color printing based on the original image data can be extended, a user convenience improves.

Further, according to the present embodiment, a plurality of similar color images, which the conversion conditions are different, are arranged on toner usage adjustment request screen 100 generated by adjustment request screen generating part 84. In toner usage adjustment request screen 100, it is selectable in a plurality of conversion conditions based on a plurality of similar color images. By this configuration, the user can select the conversion condition permissible among the plurality of similar color images, which the conversion conditions are different. Therefore, the number of users who cooperates with correcting the variation can be increased.

Further, according to the present embodiment it has memory part 9 that stores the conversion condition accepted the selection in toner usage adjustment request screen 100 as similar color information. Adjustment request screen generating part 84, when the similar color information is stored, generates toner usage adjustment request screen 100 for being selectable the conversion condition stored as similar color information. This configuration can raise a possibility that the user cooperate in correction of variation.

As summarized, in a typical apparatus, when remaining toner amount is discriminated as it is little and printing is impossible, it becomes a greatly different coloring from the original image data, and thus the user who cares about the coloring cannot print. Therefore, when the variation in the remaining toner amount is large, only the toner for a specific color is exhausted, quickly, and thus there is a problem that the period being able to support full color printing based on the original image data becomes short.

The present disclosure is accomplished in view of this respect, and the point of the subject is providing an image forming apparatus that the variation in remaining toner amount can be corrected and the period being able to support the full color printing based on the original image data can be extended.

According to the present disclosure, before the toner for a specific color is exhausted and printing becomes impossible, the variation in remaining toner amount is correctable, and thus it produces the effect that the period being able to support the full color printing based on the original image data can be extended.

In addition, the present disclosure is not limited to above-mentioned each embodiment, and it is clear that each embodiment may be suitably changed within the limits of the technology conception in the present disclosure. For example, in an above-mentioned embodiment, although the example that uses toner as a printing agent is explained, ink, or the like, maybe used. In addition, in the above embodiment, four colors are shown as an example for the printing agents. However, 3 colors, such as cyan, magenta, yellow can be used, and 5 or more colors, including any middle colors, such as any combination of hue, brightness, and saturation can be used.

What is claimed is:

1. An image forming apparatus that prints image data by using printing agents for a plural color, comprising:
    a printing agent residual quantity detecting part that detects respective printing agent residual quantities for the plural color;
    a color scheme selection tendency management part that manages an amount of a printing agent used per unit number of sheets for each color of a plurality of colors as color scheme selection tendency information;
    a remaining number calculation part that computes printable number of sheets for each color of the plurality of colors with a printing agent residual quantity based on the printing agent residual quantity and the color scheme selection tendency information;
    an adjustment request screen generating part that generates, when a variation in the printable number of sheets for each color of the plurality of colors is determined to be greater than or equals to a fixed quantity, a printing agent using amount adjustment requesting screen for selecting a conversion condition to correct the variation, wherein:
        in the printing agent using amount adjustment requesting screen, a plurality of similar color images are displayed;
        each of the plurality of similar color images is a preview image showing a different conversion condition of a plurality of conversion conditions;
        each of the plurality of conversion conditions provide a different reduction in printing agent usage of a color; and
        each of the plurality of the conversion conditions can be selected based on a selection of its corresponding similar color image;
    an image processing part that performs color balance conversion of the image data on the conversion condition selected from the printing agent using amount adjustment requesting screen;
    a printing part that prints the image data subjected to the color balance conversion; and
    a memory part that stores, as similar color information, the conversion condition selected in the printing agent using amount adjustment requesting screen; wherein the adjustment request screen generating part generates, when the similar color information is stored, the printing agent using amount adjustment requesting screen from which the conversion condition stored in the memory part is selectable as the similar color information.

2. The in image forming apparatus of claim 1, wherein the printing agent using amount adjustment requesting screen displays an image preview corresponding to source image data in which no conversion condition is applied, wherein the source image data can be accepted for printing based on a selection of the image preview corresponding to the source image data.

3. An image forming method performed by an image forming apparatus that prints image data by using printing agents for a plural color, comprising:
    detecting respective printing agent residual quantities for the plural color;
    managing an amount of a printing agent used per unit number of sheets for each color as color scheme selection tendency information;
    computing printable number of sheets for each color with a printing agent residual quantity based on the printing agent residual quantity and the color scheme selection tendency information;
    determining whether a variation in the printable number of sheets for each color is greater than or equals to a fixed quantity;
    generating, when variation in the printable number of sheets for each color is determined to be greater than or equals to a fixed quantity, a printing agent using amount adjustment requesting screen for selecting a conversion condition to correct the variation, wherein the printing agent using amount adjustment requesting screen displays a plurality of similar color images; wherein each of the plurality of similar color images is a preview image showing a different conversion condition of a plurality of conversion conditions;

each of the plurality of conversion conditions provide a different reduction in printing agent usage of a color; and each of the plurality of the conversion conditions can be selected based on a selection of its corresponding similar color image;

receiving a selection of the a similar color image of the plurality and accepting the conversion condition corresponding to the selected similar color image;

performing color balance conversion of the image data on the conversion condition selected in the printing agent using amount adjustment requesting screen;

printing the image data subjected to the color balance conversion; and storing on a memory part, as similar color information, the conversion condition selected in the printing agent using amount adjustment requesting screen; wherein, when the similar color information is stored, the printing agent using amount adjustment requesting screen is generated and the conversion condition stored in the memory part is selectable from the adjustment requesting screen as the similar color information.

* * * * *